United States Patent
Amin et al.

(10) Patent No.: US 6,411,807 B1
(45) Date of Patent: *Jun. 25, 2002

(54) ROAMING AUTHORIZATION SYSTEM

(75) Inventors: Umesh J. Amin, Redmond, WA (US); Michael Redden, Greenwich, CT (US)

(73) Assignee: AT&T Wireless Service, Inc., Kirkland, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/597,066

(22) Filed: Feb. 5, 1996

(51) Int. Cl.⁷ .................................................. H04Q 7/38
(52) U.S. Cl. ........................ 455/432; 455/435; 455/411
(58) Field of Search ................................ 455/410, 411, 455/432, 433, 435, 422, 517, 524, 424, 419, 564, 512, 513; 380/247, 248

(56) References Cited

U.S. PATENT DOCUMENTS

| | | | |
|---|---|---|---|
| 5,335,278 A | | 8/1994 | Matchett et al. |
| 5,535,431 A | * | 7/1996 | Grube et al. ................. 455/411 |
| 5,610,973 A | * | 3/1997 | Comer ........................ 455/432 |
| 5,734,977 A | * | 3/1998 | Sanmugam ................. 455/410 |
| 5,862,480 A | * | 1/1999 | Wild et al. .................. 455/432 |

FOREIGN PATENT DOCUMENTS

| | | |
|---|---|---|
| EP | 97101730 A2 | 7/1997 |
| WO | 93/11646 A1 | 6/1993 |

OTHER PUBLICATIONS

G. P. Eleftheriadis and M. E. Theologou, "User Profile Identification in Future Mobile Telecommunications Sytems, " IEEE Network, Sep. 1994.*
Patent No. 4790003, filed on Apr. 27, 1987 and issued on Dec. 6, 1988 to Garry D. Kepley, et al.
"Conversant 1 Voice System: Architeture and Applications"by Robert J. Perdue and Eugene L. Rissanen, AT&T Technical Journal, vol. 65, Issue 5, Sep./Oct. 1986, Short Hills, New Jersey.
European Search Report For EP 97101730.
Communication Under Article 96(2) EPC For EP 97101730.

* cited by examiner

Primary Examiner—Lester G. Kincaid
(74) Attorney, Agent, or Firm—Gray Cary Ware & Freidenrich

(57) ABSTRACT

A roaming restriction system permits a wireless carrier or a subscriber to set a profile that identifies a chosen time window within which the subscriber's wireless calls that are originated from one or more selected roaming areas, are not allowed to be completed, while calls that are initiated either from authorized roaming areas or outside the chosen time window are allowed to be completed. The roaming restriction system allows a wireless carrier to either suspend or grant roaming privileges for a given subscriber within one or more location areas, and for a particular time window.

25 Claims, 5 Drawing Sheets

*FIG. 4*

| WIRELESS SUBSCRIBER'S PROFILE FOR A MIN/ESN PAIR |||||||
|---|---|---|---|---|---|---|
| SUBSCRIBED FEATURES ||||| ROAMING RESTRICTION PER MSC (RRM) || |
| CALL WAITING | CALL FORWARDING | 3-WAY CALLING | ... | INTERNATIONAL CALLING | RRM LIST | TIME SPECIFICATION |
| YES | YES | NO | ... | NO | 1 | 02/28/99 |
| | | | | | 3 | 05/16/98 |
| | | | | | 50 | 02/11/99 |
| | | | | | ...... | ...... |
| | | | | | 250 | 06/20/99 |

| ROAMING CHARACTERISTIC | PERSONAL INFORMATION |
|---|---|
| 1 | XXXX |

FIG. 5

| RRM LIST #1 |
|---|
| MSCID = 28 |
| MSCID = 15 |
| ⋮ |
| MSCID = 33 |

ROAMING AUTHORIZATION SYSTEM

TECHNICAL FIELD OF THE INVENTION

This invention relates to communications systems, and more specifically, to a method and system for authorizing wireless users to roam in selected radio coverage areas.

BACKGROUND OF THE INVENTION

Over the last twenty years wireless communications systems have evolved from their simple origins of single-operator wireless networks to multi-operator seamless roaming networks that allow wireless callers to receive and to initiate calls from wherever they might be—in their home service territory or in a roaming area that might even be located in a foreign country. A great number of technical and administrative obstacles had to be overcome before a subscriber of one wireless service provider could transparently receive wireless communications services from the network of another service provider. For example, multilateral operating agreements had to be negotiated between service providers to standardize communications between the dissimilar switching systems of the different service providers' networks. Most importantly, a common signaling protocol and signaling messages format and definition had to be agreed upon by all participating wireless service providers for exchange of call handling messages between their switching systems.

Because of the significant differences in the communications systems architectures and switching systems used by the different service providers, only a small number of common signaling messages for essential call processing functions (e.g., registration) could be agreed upon by the different service providers. As a result, a service provider-specific implementation for addressing a particular problem, such as wireless fraud, could not be universally adopted by all service providers. For example, the common practice that requires a wireless subscriber to provide authentication information before receiving service, could not be implemented for all roaming callers. The inability to implement an authentication procedure for some roaming callers may be attributed to a variety of factors not the least of which is the home carriers' unwillingness to implement authentication procedures in their networks.

Taking advantage of the lack of communications between switches for fraud prevention information, roaming areas have been targeted as launching pads to initiate fraudulent calls, thereby depriving wireless communications carriers of yearly revenues estimated at over half a billion dollars. Typical fraudulent ploys for the theft of wireless communications services include, for example, eavesdroppers intercepting legitimate subscriber's wireless telephone sets' Mobile Identification Numbers (MIN) and Electronic Serial Numbers (ESN) pairs from wireless communications frequencies, and publicizing those pairs over fraud-information-dissemination forums, such as electronic bulletin boards. The intercepted MINs and ESNs pairs are then programmed into an illegal wireless device to enable a fraud perpetrator to initiate roaming wireless calls that are charged to the legitimate subscribers' accounts.

In response to this ever-growing problem, some communications carriers have felt compelled to implement additional fraud prevention measures that either deny or restrict access to their network for certain types of wireless calls. For example, some communications carriers have implemented drastic fraud prevention procedures, such as denial of service for calls originated from particular roaming areas. While these procedures have been quite effective in limiting incidences of wireless communications fraud, it is undeniable that they present certain shortcomings. For example, denying access to a wireless network for calls originated from certain roaming areas may have the negative effect of possibly denying access to communications services to a great number of legitimate wireless subscribers when those services might be most needed. The denial of service is particularly vexing to a subscriber when no land-line communications services are available, as on a deserted road. Equally significant is the loss of roaming and air time charges and (possibly) long distance revenues that the service provider would have received as proceeds for the completion of the denied calls. Hence, it is a continuing problem for wireless communications carriers to implement fraud prevention measures that are neither unduly inconvenient to wireless subscribers nor overly revenue-limiting for wireless service providers.

SUMMARY OF THE INVENTION

The present invention is directed to a wireless network that grants roaming privileges to a wireless communications service subscriber for one or more selected roaming areas only during a limited time period that is identified in a profile of that subscriber. In an illustrative embodiment of the principles of the invention, a wireless communications service subscriber is allowed to set a profile that identifies a chosen time window within which wireless calls originated from one or more selected roaming areas are permitted to be completed while wireless calls that are initiated outside of the chosen time window and that are originated from any one of these selected roaming areas are automatically terminated. Similarly, calls initiated from unauthorized roaming areas are also terminated.

The subscriber's profile may be, for example, a data structure, such as a table, that associates the subscriber's mobile end-user device MIN and/or ESN to the time window for the selected roaming area(s). Hence, when the subscriber powers on a mobile end-user device to register from a selected roaming area, the MIN and/or ESN associated with the mobile end-user device is used as a search key to retrieve the subscriber's profile. The subscriber's profile may be stored, for example, at the Home Location Register of the subscriber's service provider. The current date, i.e., the date at which the registration process is initiated, is then compared to the time window information retrieved from the profile. If the current date falls within the range of permissible dates specified in the profile for the selected roaming area, the registration process proceeds in a conventional manner. Otherwise, a registration denial procedure may be initiated based, for example, on the subscriber's roaming history.

According to an aspect of the invention, if the MIN/ESN pair associated with the mobile end-user device indicates, for example, that the subscriber is a frequent roamer, a call intercept feature may be activated for the mobile end-user device. Hence, when a call is initiated from the mobile end-user device, the call is automatically routed to a live or automatic operator instead of its intended destination. The operator then prompts the caller for certain information to validate the caller's identity. If the information provided by the caller is valid, the call is then completed to its intended destination. Otherwise, the call is terminated.

According to another aspect of the invention, when fraud is detected for a given subscriber within a given roaming area, the serving wireless service provider can deny services to that particular subscriber either for a finite amount of time or on a permanent basis. Alternatively, services may be allowed or denied based on the results of further verification of the subscriber's identity.

BRIEF DESCRIPTION OF THE DRAWING

In the drawings:

FIG. 4 illustrates a profile that associates MINs and ESNs with selected roaming areas; and FIG. 5 illustrates a table that correlates MINs and ESNs to a permissible roaming time period.

DETAILED DESCRIPTION

Figure 1:
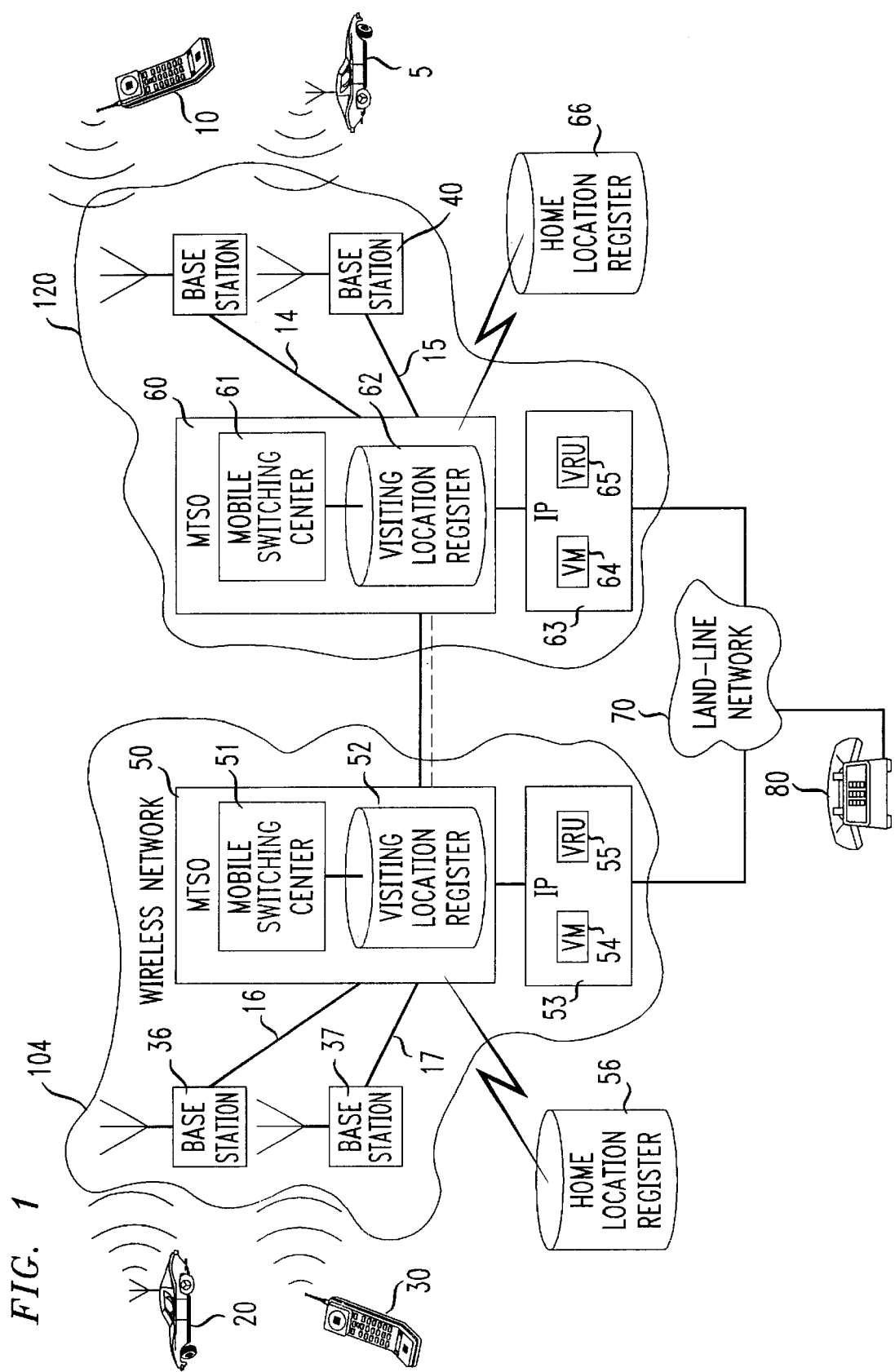
FIG. 1 is a communications switching system arranged in accordance with the invention to allow wireless communications services providers to authorize wireless calls from selected roaming areas.

Shown in FIG. 1 is a multi-operator seamless roaming communications network that includes a land-line network 70, a wireless visiting network 104 and a wireless home network 120. The land-line network 70 includes interconnected local, tandem and toll switches (not shown) that enable a telephone call initiated from wired telephone 101 to be completed to another telephone set, such as set 80, or to be forwarded to wireless network 120 or 104 for completion to a mobile end-user device such as wireless telephone set 10 or 20. Hereinafter mobile end-user devices 5, 10, 20 and 30 are simply referred to as "mobiles" 5, 10, 20 and 30.

Each mobile is typically assigned a home network, so that, at any given time, a particular mobile may be either located in its home network or roaming in another network. However in this example, for the sake of consistency and simplicity, wireless network 104 is labeled "visiting network" 104 while wireless network 120 is called "home network" 120. This is done to more clearly separate the role of visiting network 104 (in which the roaming mobile 20 or 30 is currently located) from the functions of home network 120 (which is the wireless service provider for the owner of roaming mobile 20 or 30). Specifically, visiting wireless network 104 is arranged to detect the presence of roaming mobiles 20 and 30, and to inform home network 120 of that presence. By contrast, home network 120 is responsible for communicating to visiting network 104 signaling information indicative of permission to grant roaming privileges to roaming mobiles 20 and 30. Other information transferred by home network 120 to visiting network 104 includes a list of features subscribed to by the owner of roaming mobiles 20 and 30, as described in further detail below with reference to FIG. 4. Mobiles 20 and 30 may use any conventional wireless technology for communicating with visiting wireless network 104. For example, mobile 20 may be a conventional cellular telephone set while mobile telephone set 30 may be a low-mobility Personal Communications Service (PCS) end-user device. Although mobiles 20 and 30 are shown in FIG. 1 as a car phone and a wireless telephone set, respectively, it is to be understood that mobiles 20 and 30 may be wireless data communications or multimedia communications devices.

Figure 2:
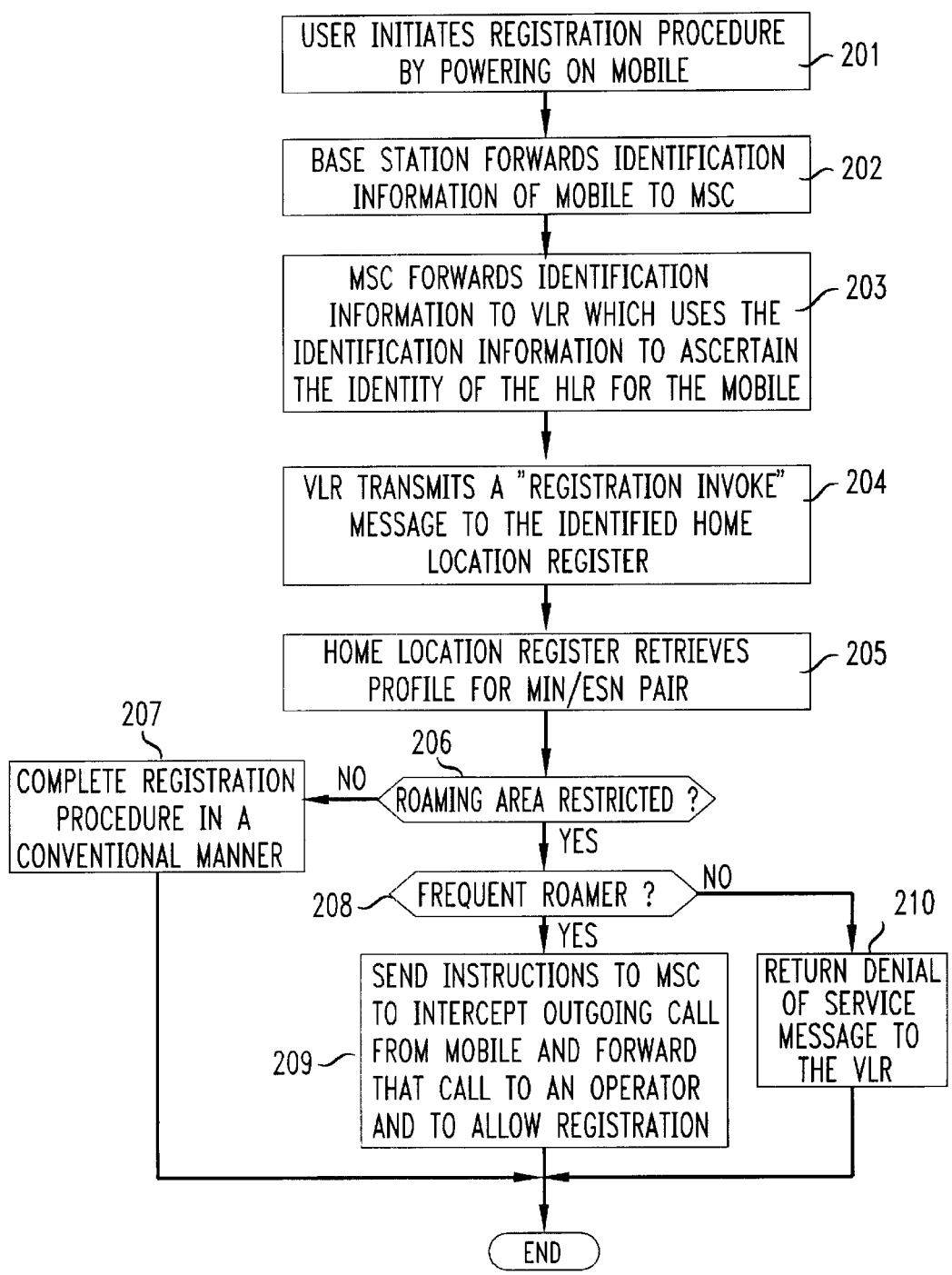
FIGS. 2 and 3 are flow diagrams of call processing instructions executed by some of the components of FIG. 1 to register a mobile end-user device, and to complete wireless calls from selected roaming areas.

The operations of wireless visiting network 104 and wireless home network 120 and the interactions of their elements to implement the principles of the invention are better understood when described in conjunction with a flow diagram for the registration process for one of the mobiles, mobile 20, for example. This flow diagram is shown in FIG. 2 and is described below with reference to the elements of FIG. 1. Because visiting network 104 and home network 120 are (for the sake of simplicity) similarly configured, a description of the components of visiting network 104 is provided below with reference to equivalent components in home network 120 indicated in parentheses.

Also shown in FIG. 1 is Intelligent Peripheral (IP) 53 (63) that is connected to MTSO 50 (60). One of the modular components that may be included in IP 53 (63) is Voice Response Unit (VRU) 53, which is arranged to prompt a caller for specific information by asking questions in the form of recorded announcements that are based on a set of modules in a transaction script. Relevant information collected from a caller in the form of Dual Tone Multi-Frequency (DTMF) signals or speech input is interpreted by VRU 53 for delivery to Home Location Register (HLR 91), as explained below. Voice Response Unit 53 (63) may be implemented using, for example, vendors' products, such as the Brite system or the AT&T Conversant Voice System whose architecture and features are described in *AT&T Technical Journal,* Vol. 65, Issue 5, pp. 33–47, September/October 1986. Also shown in FIG. 1 as a modular component of IP 53 (63) is Voice Mail (VM) system 54 which is arranged to deliver a prompting announcement soliciting a telephone number at which a calling party can be reached. Well-known voice mail systems include the Octel Communications System and the AT&T Audio exchange system whose features and functionality are described in U.S. Pat. No. 4,790,003 issued to G. D. Kepley, et al. on Dec. 6, 1988.

As is known in the art, the registration process allows the identity and the relative position of a mobile in an active idle state to be known to a home network, such as home network 120, for functions such as a) delivery of incoming calls to the wireless set, and b) billing for calls initiated or received by the set. The registration process is typically initiated when a user powers on wireless telephone set 20, as indicated in step 201. When visiting wireless network 104 is an analog communications system that implements, for example, the Advanced Mobile Phone Service (AMPS) cellular radio standard, mobile 20 determines the frequency of the strongest received radio signal to locate the reverse control radio channel associated with the nearest base station, which may be either base station 36 or 37 depending on factors such as the strength of signals radiated by one of these base stations. As is known in the art, the reverse radio control channel is a signaling channel that is used by a base station to exchange signaling information with mobiles in the radio coverage area of a base station known as a "cell".

Once the reverse control radio channel of base station 36, for example, is located by mobile 20, that mobile transmits signaling information to base station 36 via the identified radio control channel. Signaling information communicated by mobile 20 to one of the base stations 36 and 37 for the registration process includes the Mobile Identification Number (MIN) and the Electronic Serial Number (ESN) of mobile 20. Base stations 36 and 37 (39, 40) include transceivers and other hardware arranged to transfer via the airwaves information received from Mobile Telephone Switching Office (MTSO) 50 (60) via wired facilities 16 and 17 (14 and 15) respectively. Alternatively, point-to-point microwave links may also be used to connect base stations 36, 37 (39, 40) to MTSO 50 (60). Similarly, information received from the mobiles via the airwaves is transferred by base stations 36 and 37 (39 and 40) to MTSO 50 (60) via point-to-point microwave links or land-line facilities 16 and 17 (14 and 15) respectively. Hence, upon receiving the MIN and ESN pair associated with mobile 20, base station 36 typically transmits the MIN/ESN information to MTSO 50, as indicated in step 202.

MTSO 50 (60) is comprised of a set of modular hardware and software components designed to administer the allocation of radio channels within the visiting network 104 (home network 120), and to coordinate paging of wireless telephone sets 10 and 30 for calls destined for those sets. MTSO 50 also coordinates hand-off of calls (in progress) from one base station to another, as mobile 20 leaves one cell to cross the borders of another cell. Although MTSO 50 (60) is shown in FIG. 1 as being remote from base stations 36 and 37, (39 and 40), it is to be understood that MTSO 50 (60) may be co-located with one of the base stations 36 and 37 (39 and 40).

One of the modular components of MTSO 50 (60) is Mobile Switching Center (MSC) 52 (62) which is typically a processor-controlled software-driven switching system arranged to provide seamless communications paths by bridging radio channels and wired channels for calls routed over visiting wireless network 104 (home network 120) and land-line network 70. Of particular significance is the role played by MSC 51 (61) in the registration process mentioned above. Specifically, when MSC 51 (61) receives from base station 36 a registration request message which includes the MIN and ESN pair of mobile 30, MSC 51 proceeds to send that message to VLR 52, which determines based on the digits of the received MIN, that mobile 30 is a roaming mobile. VLR 52 is a database facility that is used to retrieve information for handling communications services requests from a roaming mobile. VLR 52 uses the MIN and ESN pair included in the REGNOT message to identify Home Location Register (HLR) HLR 66 as the home location register of mobile 30. Thereafter, VLR 52 sends a Registration Notification (REGNOT) message to Home Location Register (HLR) HLR 66. As is known in the art, an HLR is a database facility that stores subscriber information associated with a mobile. Information stored for a subscriber includes the MIN/ESN pair of the subscriber's mobile end-user device, and the subscriber's profile which identifies the set of features, capabilities and/or operations restrictions associated with the subscriber for roaming and local communications services.

Figure 5:
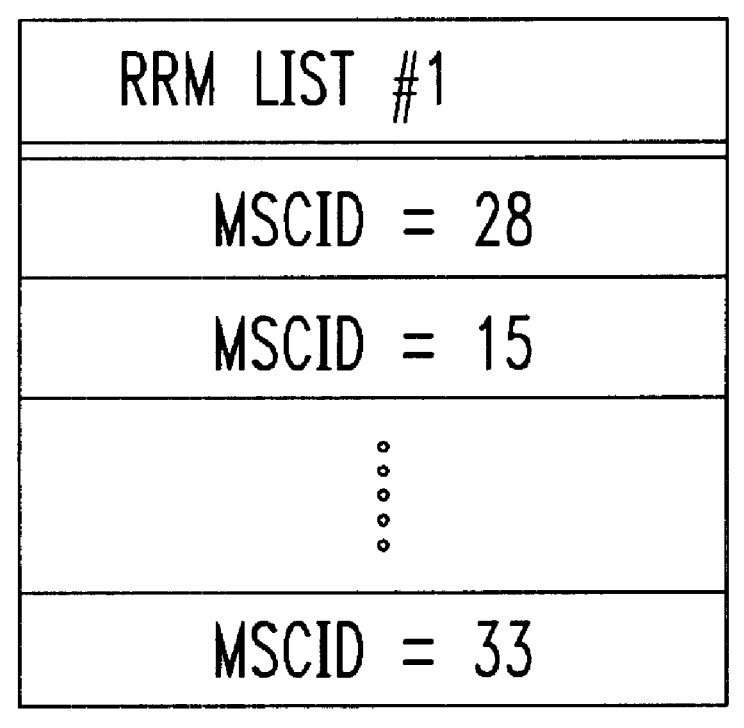

FIG. 4 shows an illustrative table that stores information associated with a profile of a wireless subscriber. The fields grouped under the header "subscribed features" indicate the different communications services features that may be subscribed to by a user. Although the table of FIG. 4 shows only the call waiting, call forwarding, 3-way calling and international calling features, it is to be understood that other features may also be available. Information associated with the respective date/time within which a subscriber can roam in one or more particular location areas is shown in the table of FIG. 4 under the "Roaming Restriction per MSC (RRM)" group of fields. As is well known in the art, a location area is a wireless geographical area served by an MSC. Thus, the unique identification number of an MSC called "MSCID" identifies not only the MSC but also the location area served by the MSC. The RRM group of fields includes a RRM List field which is a pointer identifying a set of location areas (illustrated in the table of FIG. 5) in which roaming is authorized only when certain conditions are met. For example, the subscriber whose profile is shown in the table of FIG. 4 can exercise roaming privileges in location areas associated with MSCIDs 28, 15 and 33 only after the date indicated in the time specification field. In actual application of the principles of the invention, the date in the time specification field may be entered in YYDDD format, where YY represents the last two digits of the year, and $1 \leq DDD < 366$. As is well known in the art, the YYDDD format allows easier comparison of the date stored in the time specification field ($t_1$) with current date ($t_0$). It is worth noting that a subscriber is free to roam in a location area that is not identified by a pointer in the RRM list in the subscriber's profile. Advantageously, the tables of FIGS. 4 and 5 provide great flexibility in designing a profile for a subscriber since a profile may have 20 entries (or more) in the RRM group of fields, and any combination of 256 (or more) different MSCIDs represented in those entries.

Also shown in the table of FIG. 4 is the roaming characteristic associated with a particular MIN/ESN pair. A subscriber who is a frequent roamer is given a roaming characteristic value of "1" while a value of "0" in the roaming characteristic field indicates that a subscriber has no (or very little) roaming history. Alternatively, values ranging from 0 to 9 may be used to identify the roaming characteristics of a subscriber. In the latter case values above a threshold of 4 or 5, for example, would indicate that a subscriber is a frequent roamer.

Referring back to FIG. 2, once VLR 52, in step 203, identifies HLR 66 as the home location register of mobile 30, VLR 52 transmits a "registration invoke" signaling message to HLR 66, in step 204, to request the subscriber profile stored in HLR 66. The "registration invoke" signaling message includes the MSCID of MSC 51 and the MIN/ESN pair. Upon receiving the "registration invoke" signaling message, HLR 66 uses the MIN/ESN pair of mobile 30 to retrieve the subscriber's profile associated with that mobile, as indicated in step 205. Thereafter, HLR 66 determines, in step 206, whether roaming privileges are restricted for the received MIN/ESN pair in the roaming area from which the registration request originated. This is achieved in a two-step process. In a first step, the pointers represented by the contents of the RRM list field in the subscriber's profile are used to retrieve the MSCIDs illustrated n FIG. 5. In a second step, the MSCID included in the "registration invoke" message is compared to each one of the retrieved MSCIDs. If no match is found, HLR 66 proceeds with the registration procedure in a conventional manner, as indicated in step 207. If a match is found, however, HLR 66 compares the current date with the date indicated in the time specification field in the profile for the RRM list number in question. If the content in the time specification field indicates a later date than the current date, HLR 66 proceeds with the registration procedure as follows.

According to another aspect of the invention, when the roaming area in question is restricted, as indicated by an earlier date than the current date in the time specification field, HLR 66 determines in step 208 whether the subscriber associated with the MIN/ESN pair of mobile 20 is a frequent roamer. This is indicated, in this illustrative example, by a value of "1" in the roaming characteristic field of the profile for a frequent roamer and a value of "0" for an infrequent roamer. What is considered a frequent roamer is implementation-dependent. For example, a service provider may consider a subscriber who roams three times (or more) a month a frequent roamer, while another service provider may label a frequent roamer only subscribers who roam 10 times (or more) a month. Other service providers may prefer to use a longer or shorter time period per number of roaming occurrences. If the subscriber is not a frequent roamer, as determined in step 208, a denial of registration message is returned to the VLR, as shown in step 208. For a frequent roamer, HLR 66 sends a signaling message to VLR 52 to instruct the latter to intercept any outgoing call initiated by mobile 20 and to complete the call instead to either a live operator (not shown) or to Voice Processing System 63. Upon receiving the call interception signaling message from HLR 91, VLR 52 creates a record in its data structure for the MIN/ESN pair of mobile 20. The record will include the telephone number of Voice Processing System 63 (or the operator) to which intercepted calls should be forwarded.

Figure 3:
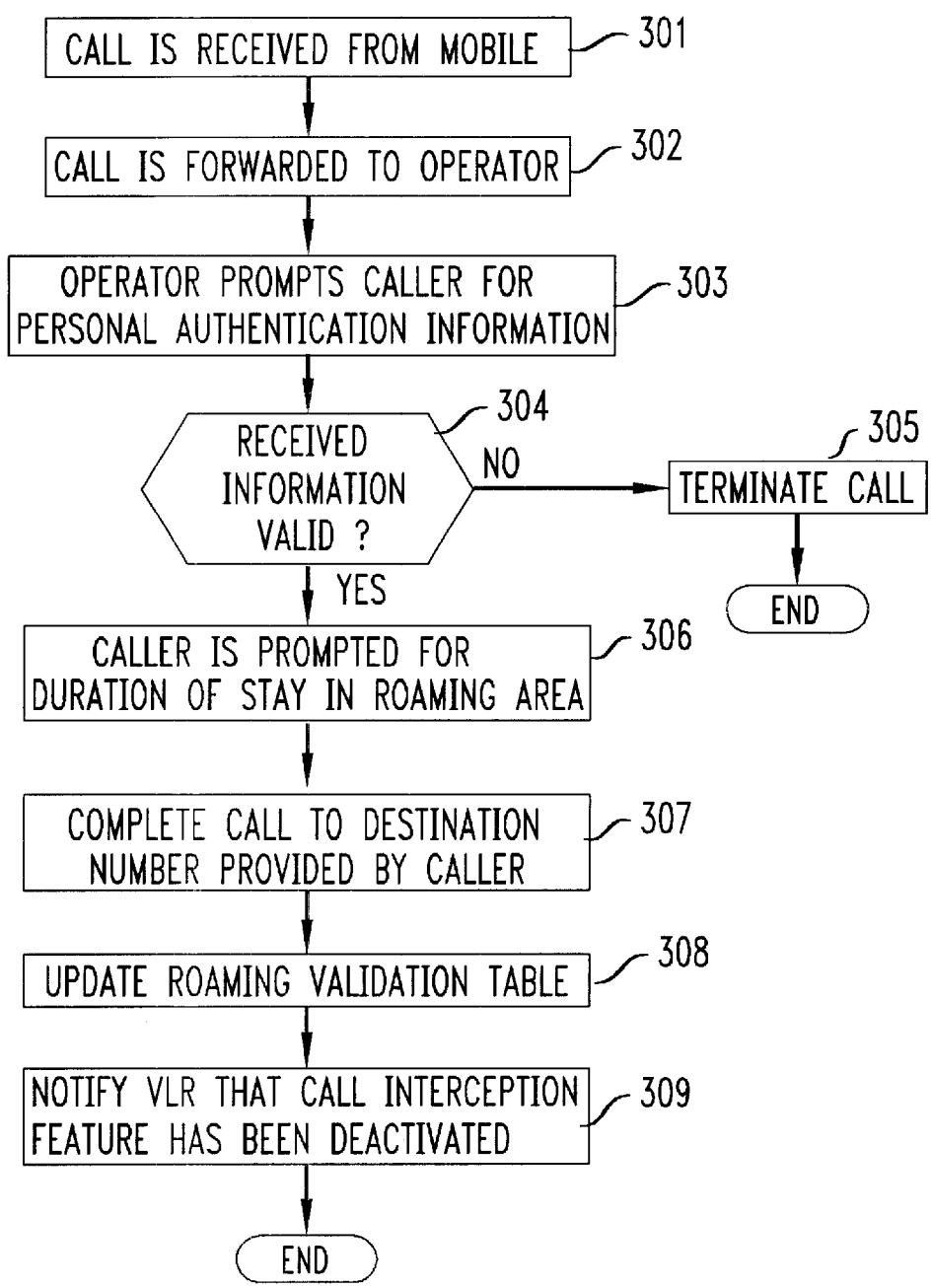

FIG. 3 shows illustrative processing instructions executed by some of the elements of FIG. 1 to complete wireless calls initiated from mobile 20 when the call interception feature has been activated as part of the registration process. When a user at mobile 20 initiates a wireless call, as shown in step 301, the call is received by base station 36 which forwards the MIN/ESN and the dialed number to MSC 51 via line 16. MSC 51 queries VLR 52 to determine how to complete the call. Upon determining that the call interception feature is activated for the MIN/ESN pair associated with the call, VLR 52 instructs MSC 51 to forward the call and the dialed number to Voice Response Unit 65, as illustrated in step 302.

Voice Response Unit 55, in step 303, uses recorded announcements stored therein to prompt the caller for personal authentication information. Questions posed to a caller may include, for example, the subscriber's social security number, date of birth or other information that can be entered as digits on a dial pad. When Voice Response Unit 55 is equipped with a speech recognition system, additional information, such as billing address or mother's maiden name, may also be collected as authentication information from the caller. Voice Response Unit 55 proceeds to transfer the collected information to HLR 66 for validation therein. This may be accomplished, for example, by comparing the information collected from the caller to data stored in the personal information field in the subscriber's profile of FIG. 4. If a match is found, the information provided by the caller is considered valid. Otherwise, the information received by Voice Response Unit 55 from the caller is considered invalid. When the received information is invalid, as determined in step 304, the call is terminated, as indicated in step 305. Alternatively, law enforcement authorities may be alerted for appropriate action.

If the received authentication information is valid, Voice Response Unit 55, in step 306, prompts the caller for information which includes his or her duration of stay in the roaming area. Thereafter, Voice Response Unit 55, in step 307, completes the call to the destination number provided by the caller. This is accomplished, for example, by Voice Response Unit 55 instructing MSC 61 to establish a connection to the destination number provided by the caller and bridging the first leg of the connection (i.e., from the caller to Voice Response Unit 55) to the second leg of the connection (i.e., from MSC 61 to the destination number provided by the caller).

After completion of the call, Voice Response Unit 55 transfers the duration of stay information collected from the caller to HLR 66. Upon receiving that information, HLR 66, in step 308 enters that information in the time specification field of FIG. 5 to update the subscriber's profile. Thereafter, HLR 66, in step 309, sends a signaling message to VLR 52 to indicate that the call interception feature has been deactivated.

Although MSC 51 (61), HLR 56 (66) and VLR 52 (62) are shown in FIG. 1 as distinct physical components, it is to be understood that those components may be integrated in one networking entity that performs the individual functions carried out by each one of those components.

According to another aspect of the invention, the time specification field may be populated by a caller dialing a telephone number, such as a toll-free number that is associated with Voice Response Unit 55 to populate the roaming restriction period field for one or more selected roaming areas. This method may also be used to select a new roaming area. Population of the roaming restriction field using this method involves Voice Response Unit 55 prompting a caller for authentication information before the caller is authorized to select a roaming area or provide time specification data for a roaming area. At the end of the call, Voice Response Unit 55 transfers the collected information to HLR 66 for storage in the tables of FIGS. 4 and 5.

The foregoing is to be construed as only being an illustrative embodiment of this invention. Persons skilled in the art can easily conceive of alternative arrangements providing functionality similar to this embodiment without any deviation from the fundamental principles or the scope of this invention.

The invention claimed is:

1. A method of processing a communications service request from a mobile end-user device within a roaming area, said method comprising:

receiving at a wireless communications system a communications service request initiated by a mobile end-user device, said request comprising identification information associated with said mobile end-user device, and information indicative of said roaming area;

retrieving a profile associated with said mobile end-user device, said profile comprising a roaming restriction time period associated with said roaming area;

determining whether the communications service request is made within said roaming restriction time period; and denying said communications service request to said mobile end-user device when said request is received within said roaming restriction time period.

2. The method of claim 1, wherein said identification information associated with said mobile end-user device includes an electronic serial number.

3. The method of claim 1, wherein said identification information associated with said mobile end-user device includes a mobile identification number.

4. A method of operating a network providing wireless communications services, said method comprising:

storing in a memory data structures related to identification information for at least one wireless subscriber, and at least one selected roaming area from which said at least one wireless subscriber is prohibited from initiating wireless calls within a selected period of time;

determining whether a connection request is made within said selected period of time; and denying said connection request when it is initiated from said at least one selected roaming area and within said selected period of time.

5. A communications system for processing registration requests for wireless calls, said system comprising:

a storage area containing data structures related to identification information of at least one mobile end-user device and at least one selected roaming area in which wireless calls that are initiated therefrom within a predefined time period with said at least one mobile end-user device are prohibited from being completed; and a processor that analyzes signaling information received in connection with a registration request for a wireless call to inquire whether at least a portion of said signaling information matches said identification information and said at least one selected roaming area stored in said storage area, and in response to a positive answer to said inquiry, denies said registration request when said registration request is initiated within said predefined time period.

6. The system of claim 5, wherein said identification information includes an electronic serial number for said at least one mobile end-user device of said at least one wireless subscriber.

7. The system of claim 5, wherein said identification information includes a mobile identification number.

8. A wireless communications system comprising:
a switching system that receives at time $t_0$ a communications service request initiated by a mobile end-user device for a wireless call, said request including identification information associated with said mobile end-user device and a roaming area from which said request for registration originated; and
a processor which receives said identification information and instructs said switching system to deny said communications service request from said mobile end-user device when said processor determines that at least a portion of said received identification information matches an entry in a profile that prohibits honoring said communications service request to said mobile end-user device for calls initiated by said mobile end-user device from said roaming area determined to be made before a predetermined period of time $t_1$, where $t_1 > t_0$.

9. A method of processing a wireless call initiated from a mobile end-user device, said method comprising:
receiving at a wireless communications switch a communications service request for said wireless call initiated by a caller with a mobile end-user device, said request including: identification information associated with said mobile end-user device, a roaming area from which said request was initiated and a called party number;
retrieving a profile associated with said mobile end-user device using at least a portion of said identification information as a search key;
ascertaining roaming characteristics of a subscriber associated with said mobile end-user device and predefined date or time restrictions on completion of calls initiated with said mobile end-user device from said roaming area; and
redirecting said wireless call to an operator based on said roaming characteristics associated with said subscriber when said predefined date or time restrictions are in effect.

10. The method of claim 9, wherein said wireless call is redirected to said operator only when said roaming characteristics indicate that said subscriber of said mobile end-user device is a frequent roamer.

11. The method of claim 9, further comprising:
prompting said caller for authentication information; and
completing said wireless call to said called party number only when said authentication information is valid.

12. The method of claim 9, further comprising:
prompting said caller for authentication information; and
terminating said call when said authentication information is invalid.

13. The method of claim 9, further comprising:
prompting said caller for authentication information and data indicative of a duration of stay period in said roaming area;
completing said wireless call to said called party number only when said authentication information is valid; and
authorizing completion of subsequent wireless calls to their intended destination without call redirection to said operator when said subsequent wireless calls are initiated from said roaming area by said mobile end-user device and within said duration of stay period in said roaming area.

14. The method of claim 13, further comprising:
deactivating said call completion authorization for said mobile end-user device after said duration of stay period has expired.

15. A system for processing a communications service request from a mobile end-user device, said system comprising:
a wireless communications switching system which receives from a mobile end-user device a communications service request initiated by a caller to complete a wireless call, said request including identification information associated with said mobile end-user device, a roaming area from which said request was initiated and a called party number;
a database from which a profile associated with said mobile end-user device is retrieved based on at least a portion of said identification information, said profile being retrieved to determine roaming characteristics of a subscriber associated with said mobile end-user device and date or time restrictions on completion of calls initiated with said mobile end-user device from said roaming area; and
a processor which redirects said wireless call to an operator based on said roaming characteristics associated with said subscriber when said date or time restrictions are in effect.

16. The system of claim 15, wherein said processor redirects said call to said operator only when said roaming characteristics indicate that said subscriber is a frequent roamer.

17. The method of claim 14, further comprising:
a voice processing system which prompts said caller for authentication information and directs said processor to complete said call to said called party when said authentication information is valid.

18. The method of claim 14, further comprising:
a voice processing system which prompts said caller for authentication information and terminates said call when said authentication information is invalid.

19. The method of claim 14, further comprising:
a voice processing system which prompts said caller for authentication information and data indicative of a duration of stay period in said roaming area, directs said processor to complete said call to said called party when said authentication information is valid, and forwards said duration of stay period data to said processor to allow said processor to authorize completion of subsequent wireless calls to their intended destination without call redirection to said operator when said subsequent wireless calls are initiated from said roaming area by said mobile end-user device and within said duration of stay period in said roaming area.

20. A method of processing a communication request from a mobile device comprising:

receiving a communication request from the mobile device located within a roaming area, retrieving a profile associated with the mobile device, the profile comprising a roaming restriction time period for the roaming area; and denying service to the mobile device if the service request is initiated at a time defined by the roaming restriction time period.

21. A method in accordance with claim 20, wherein the retrieving comprises:

retrieving the profile based on at least a portion of identification information associated with the mobile device contained within the service request.

22. A method in accordance with claim 21, wherein the identification information comprises an electronic serial number.

23. A method in accordance with claim 21, wherein the identification information comprises a mobile identification number.

24. A method in accordance with claim 21, wherein the time defined by the roaming restriction time period comprises a date.

25. A method in accordance with claim 21, wherein the time defined by the roaming restriction time period comprises a time of day.

* * * * *

UNITED STATES PATENT AND TRADEMARK OFFICE
CERTIFICATE OF CORRECTION

PATENT NO. : 6,411,807 B1
DATED : June 25, 2002
INVENTOR(S) : Amin et al.

It is certified that error appears in the above-identified patent and that said Letters Patent is hereby corrected as shown below:

<u>Title page,</u>
Item [73], Assignee, change "AT&T Wireless Service, Inc.", to -- AT&T Wireless Services, Inc. --

Signed and Sealed this

Twenty-fifth Day of March, 2003

JAMES E. ROGAN
*Director of the United States Patent and Trademark Office*